Feb. 14, 1961

M. J. H. STAAR 2,971,763

PHONOGRAPH RECORD ADAPTER

Filed May 21, 1956

Inventor
Marcel Jules Helene Staar.

By. Carlson, Pitzner, Hubbard & Wolfe
Attys.

2,971,763

PHONOGRAPH RECORD ADAPTER

Marcel Jules Helene Staar, 30 Square du Solbosch, Brussels, Ixelles, Belgium

Filed May 21, 1956, Ser. No. 586,074

Claims priority, application Belgium Sept. 17, 1955

4 Claims. (Cl. 274—10)

Figure 1:
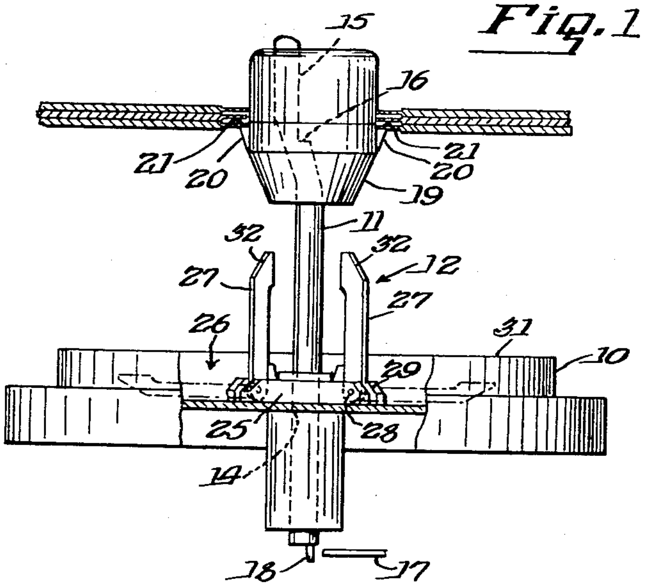

This invention relates to phonograph apparatus and more particularly an adapter assembly enabling standard record players to accommodate and play phonograph records made with center holes of different diameters.

Standard record players ordinarily are equipped with a drive for operating the record turntable selectively at 33⅓ r.p.m., 78 r.p.m., and 45 r.p.m., and have a small diameter spindle for playing 33⅓ r.p.m. and 78 r.p.m. phonograph records made with small diameter center holes. So-called "45 r.p.m." records, phonograph records made with large diameter center holes, may be played on the standard player by employing an oversize adapter for centering the records on the turntable, or by inserting a composition disk in the center hole of the record, the disk having a central aperture of the size of the small diameter spindle. The latter method has generally been found unsatisfactory by reason of the inconvenience and short life of the insert, while the former method as conventionally applied although satisfactory has certain important disadvantages. Certain of these disadvantages result by reason of the fact that in order to incorporate record change mechanism in the apparatus it is customary to form the adapter in two parts. The upper part or head is held against rotation to support a stack of records and rests on the lower part or centering boss which is carried by and turns with the turntable. In addition to supporting the record stack the upper part or head ordinarily contains the record change mechanism for releasing the records individually from the stack onto the turntable.

In the normal arrangement considerable friction is experienced between the contacting surfaces of the two parts of the adapter, exerting a drag against the centering boss. Due to this force and difficulties of alignment, the centering boss driven by the turntable may be turning out of synchronism and the records likewise may be turning at what amounts to non-uniform speed, seriously affecting the fidelity of reproduction.

It is an object of this invention to provide an adapter assembly of this type, but one where the means for receiving, guiding and centering on the turntable records released individually from a record stack, is carried on the turntable and operates independently of but in conjunction with the means supporting the stack of records above the turntable so that the assembly imposes no frictional drag on the turntable to affect its speed of rotation.

It is a further object to provide a record turntable assembly having means for accurately centering records made with center holes of different diameters.

Another object is to provide an adapter assembly enabling the playing of such records on a standard record player, which is attached to the record turntable and is capable of being placed in two positions, a first position exposed and arranged erectly for accurately centering on the turntable 45 r.p.m. records made with large diameter center holes, and a second position hidden below the surface of the turntable whereas not to interfere with the playing of 33⅓ r.p.m. and 78 r.p.m. records made with small diameter center holes.

A further object of the invention is to provide an adapter assembly enabling the playing on standard record players of 45 r.p.m. records having large diameter center holes, embodying means for supporting the records in a stack above the record turntable, receiving and guiding the records as they are released individually to descend onto the turntable, and accurately centering the records on the turntable to enable the records to be turned in perfect synchronism with the table to obtain highest fidelity of reproduction, where said assembly is unitary and may be removed from or placed in the record player apparatus at will.

Figure 2:
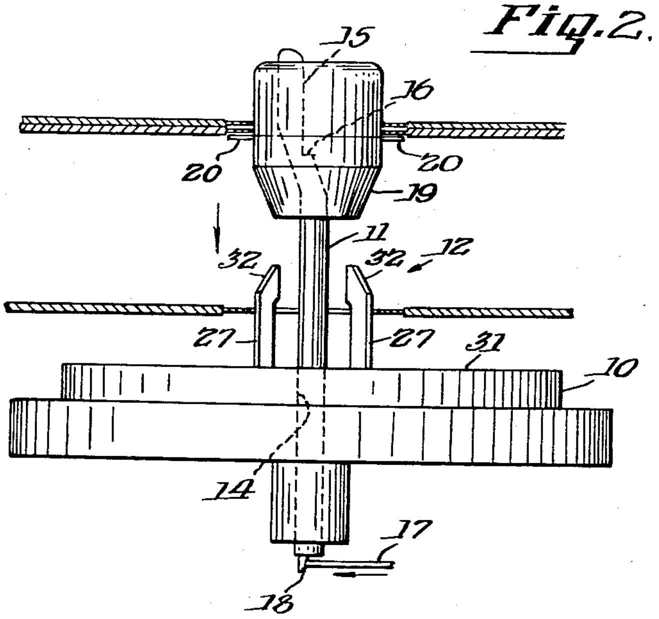

The objects of the invention thus generally set forth, together with other objects and ancillary advantages are obtained by the construction and arrangement shown by way of illustration by the accompanying drawings, in which:

Figure 1 is a side elevation view illustrating a record player for playing records made with center holes of different diameters; and Fig. 2 is a similar side elevation view illustrating the bottom record from a stack dropping toward the turntable.

While the invention is susceptible of various modifications and alternative constructions as will be evident by the drawings which show and the following description which describes in detail several different forms the invention may take, it is to be understood that it is not thereby intended to limit the invention to the specific forms disclosed. On the contrary it is intended to cover all modifications, alternative constructions and equivalents falling within the spirit and scope of the invention as expressed in the appended claims.

Referring more particularly to the drawings, in Figs. 1 and 2 there is shown for purpose of illustration a record player apparatus embodying a turntable 10 and a record spindle 11, adapted to receive and play phonograph records having small diameter center holes.

The illustrative apparatus incorporates as well, an adapter assembly 12 enabling the playing of records made with center holes of different diameters.

As standard today in the industry, phonograph record players are made to be operated at a playing speed of 33⅓ r.p.m., 78 r.p.m., or 45 r.p.m. The records adapted to be played at 33⅓ r.p.m. and 78 r.p.m. are made with small diameter center holes, while the 45 r.p.m. records, although having a substantially smaller outside diameter are made with large diameter center holes. Standard record player apparatus is constructed to accommodate and play all three types of records. Accordingly, drive mechanism is provided for operating the turntable selectively at three speeds, and the apparatus usually has a small diameter spindle for use with the records having small diameter center holes. In addition there is ordinarily provided as an attachment, an adapter assembly which may be placed on the record turntable for accommodating the player to receive and play the 45 r.p.m. records.

As shown in Figs. 1 and 2, the record spindle 11 is a small diameter spindle used for playing both 33⅓ and 78 r.p.m records. In the particular apparatus illustrated, the spindle 11 is non-rotatably supported to extend upwardly through a central aperture 14 in the turntable 10 and provides means for supporting a stack of such records above the turntable. The upper part 15 of the spindle normally serves to support the stack and has a notch 16 on which the bottom record in the stack rests. Contained within this spindle 11 are movable elements of a record change mechanism, not detailed in the figures for purposes of clarity, the record change mechanism being operable by a control member 17 which is engageable with a lever 18, one of the elements of the record change mechanism and extending from within the spindle 11. A spindle constructed in accordance with the foregoing is illustrated and described in my co-pending application Serial No. 586,297, filed May 21, 1956, and entitled "Spindle Assembly for Record Changer Apparatus."

In accordance with one aspect of the invention, to adapt this record player apaparatus for playing 45 r.p.m. records, phonograph records made with large diameter center holes, an adapter assembly 12 is provided, in the present instance embodying separate parts making up a complete assembly.

For supporting the records above the turntable, the adapter assembly 12 includes an upper part of head 19 having an outside diameter slightly undersize with relation to the diameter of the center hole of the records. Thus the records may easily slide about the head 19, which is accommodated on and carried by the spindle 11 and has on opposite sides blades 20 pivotally mounted to be movable into and out of a recess opening to the outside of the head, and when positioned outside the head as shown in Figs. 1 and 2, presenting a flat upper surface 21 on which the records in the stack may rest.

In the illustrative form of the invention depicted in Figs. 1 and 2, the head part 19 of the adapter assembly is supported above the record turntable on the non-rotatable spindle 11, and thus is likewise held against rotation. By actuating the control member 17 and by means of the record change mechanism contained within the spindle and connected to the blades 20, the records in the stack may be individually released to drop toward the turntable 10.

Means are carried by the turntable and independent of the head part 19 of the adapter assembly for receiving, guiding and centering on the turntable the records so released from the stack. Rigid with the turntable 10 and concentric with the spindle 11, is a ring or spider 25 housed within a recess 26 formed centrally within the turntable 10. A plurality of arms 27 are pivotally mounted on the ring 25 by means of pins 28 pressed into place in openings passing through lugs 29 forming part of the ring. Three of such arms 27 are included in the present instance, one arm being hidden from view behind the spindle 11. The lugs 29 are spaced to allow a snug fit of the lower ends of the arms 27, allowing the arms to pivot between the erect position shown in full lines in Fig. 1, to a horizontal position shown in dotted lines in this same figure, where they are disposed below the upper surface 31 of the turntable 10. The arms 27 are held erect without additional means for locking them in place, by the resistance to pivotal movement afforded by the inner faces of the lugs 29 bearing against the sides of the arms, although such additional means for holding the arms erect may be employed, if desired.

The upper outside corners 32 of the arms 27, as viewed in Fig. 1, are chamfered to present upwardly directed inclined surfaces. Accordingly, these arms 27 when erect serve to receive and guide toward the turntable a record released from the stack. The arms 27 also serve to center the records on the turntable. For this purpose, the arms 27 are disposed equidistantly about the spindle 11, and thus the central axis of the turntable, and are spaced to engage the edge bordering the center hole of the record when the record is accurately centered. So positioned, the arms 27 define a cylindrcal surface having a diameter slightly less than the diameter of the center hole of the record to enable the records to slide vertically downwardly about the assemblage of arms to rest on the turntable 10.

In the operation of a standard record player equipped with the adapter assembly illustrated in Figs. 1 and 2, a stack of 45 r.p.m. records is placed on the head part of the assembly, and the arms 27 lifted from their horizontal position to assume the erect position shown in Fig. 1. The bottom record is then released from the stack by means of the control member 17 and the record change mechanism, to allow the record to descend toward the turntable 10. The record as it descends is received on the arms 27 and guided toward the turntable, finally assuming a position on the turntable where the record may be played.

The adapter assembly of this invention enables the playing of records having large diameter center holes on standard record player apparatus equipped with a small diameter spindle. Furthermore, the adapter assembly of the invention is inexpensive to manufacture, simple, precise in operation, and obtains highest fidelity of reproduction in the playing of records by standard record player apparatus.

Although the invention has been described specifically in connection with enabling the playing on standard record player apparatus of "45 r.p.m." phonograph records, it will be understood that the invention may be more broadly characterized as enabling the playing of records made with center holes of different diameters. Furthermore, while it is conventional in standard apparatus today to incorporate record change mechanism within the small diameter spindle, and releasing by means of such mechanism records supported in a stack, the record change mechanism may if desired be placed on an associated part of the apparatus and operated independently of the small diameter spindle. Such modifications may be effected without departing from the spirit and scope of the invention as defined in the appended claims.

I claim as my invention:

1. In a phonograph record player having a record turntable and a non-rotatable small diameter spindle extending above the turntable for stacking and playing phonograph records having like sized center holes, an adapter assembly enabling the playing of phonograph records having relatively large diameter center holes, comprising, in combination, a head adapted to be carried on the spindle for supporting a stack of such records above the turntable, said turntable having a recess in the center thereof, and a plurality of arms pivotally mounted in the recess and disposed equidistantly about the central axis of the turntable, said arms being pivotable from a first position in the recess below the turntable surface whereby records having small diameter center holes may be played on the turntable, to a second erect position standing below the head for receiving, guiding and centering on the turntable records released from the stack, whereby said records may be played on the turntable.

2. In a phonograph record player having a record turntable and a non-rotatable small diameter spindle extending above the turntable for stacking and playing phonograph records having like sized center holes, an adapter assembly enabling the playing of phonograph records having relatively large diameter center holes, comprising, in combination, a head adapted to be carried on the spindle for supporting a stack of such records above the turntable, said turntable having a recess in the center thereof, and a plurality of arms pivotally mounted in the recess and disposed about the central axis of the turntable, said arms being pivotable from a first position in the recess below the turntable surface so that records having small diameter center holes may be played on the turntable, to a second erect position standing below the head and defining a cylindrical surface of a diameter less than the center holes of the stacked records for receiving, guiding and centering on the turntable records released from the stack, so that the latter records may be played on the turntable.

3. In a phonograph record player having a record turntable and a non-rotatable small diameter spindle extending above the turntable for stacking and playing phonograph records having small diameter center holes, and adapter assembly enabling the playing of phonograph records having relatively large diameter center holes comprising, in combination, a head adapted to be carried on the spindle for supporting a stack of records above the turntable, said turntable having a recess in the center thereof, a plurality of arms pivotally mounted at their base in the recess and disposed about the central axis of the turntable, said arms having a first position in the recess below the turntable surface so that records having small diameter center holes may be played on the turntable, and means defining a second erect position for said arms wherein the latter stands below the head defining a cylindrical surface for receiving, guiding and centering on the turntable records released from the stack so that the latter records may be played on the turntable.

4. The combination set forth in claim 3 further characterized by means carried by the turntable and cooperating with the base of said arms for holding the latter in one position or the other.

References Cited in the file of this patent

UNITED STATES PATENTS

| | | |
|---|---|---|
| 2,651,523 | Dale | Sept. 8, 1953 |
| 2,666,647 | Dale | Jan. 19, 1954 |
| 2,666,648 | Dale | Jan. 19, 1954 |
| 2,682,412 | Carlson | June 29, 1954 |
| 2,761,687 | Da Costa | Sept. 4, 1956 |
| 2,762,627 | Johnson | Sept. 11, 1956 |

UNITED STATES PATENT OFFICE

CERTIFICATION OF CORRECTION

Patent No. 2,971,763 February 14, 1961

Marcel Jules Helene Staar

It is hereby certified that error appears in the above numbered patent requiring correction and that the said Letters Patent should read as corrected below.

Column 4, line 74, for "and adapter" read -- an adapter --.

Signed and sealed this 18th day of July 1961.

(SEAL)
Attest:

ERNEST W. SWIDER
Attesting Officer

DAVID L. LADD
Commissioner of Patents